(12) United States Patent
Johnson et al.

(10) Patent No.: US 7,683,585 B1
(45) Date of Patent: Mar. 23, 2010

(54) TRAILER BATTERY CHARGE SYSTEMS AND METHODS

(75) Inventors: Brian E. Johnson, Novi, MI (US); Kang Li, Windsor (CA)

(73) Assignee: Yazaki North America, Inc., Canton, MI (US)

( * ) Notice: Subject to any disclaimer, the term of this patent is extended or adjusted under 35 U.S.C. 154(b) by 435 days.

(21) Appl. No.: 11/673,900

(22) Filed: Feb. 12, 2007

(51) Int. Cl.
*H02J 7/06* (2006.01)
*H02J 7/14* (2006.01)

(52) U.S. Cl. .................. 320/164; 320/104; 320/159

(58) Field of Classification Search .......... 320/103, 320/104, 145, 159, 164; 307/10.7
See application file for complete search history.

(56) References Cited

U.S. PATENT DOCUMENTS

| | | | |
|---|---|---|---|
| 3,090,871 A | 5/1963 | Gorman | |
| 3,704,629 A | 12/1972 | Skarivoda | |
| 4,010,410 A | 3/1977 | Kilbourn | |
| 4,055,708 A | 10/1977 | Yamamoto | |
| 4,132,942 A | 1/1979 | Yamamoto | |
| 4,743,830 A | 5/1988 | Lakey | |
| 5,289,103 A | 2/1994 | Eccleston | |
| 5,726,553 A | 3/1998 | Waugh | |
| 5,977,652 A | 11/1999 | Frey et al. | |
| 5,977,744 A | 11/1999 | Williams et al. | |
| 6,057,666 A | 5/2000 | Dougherty et al. | |
| 6,166,516 A * | 12/2000 | Albright et al. | 320/104 |
| 6,426,606 B1 | 7/2002 | Purkey | |
| 6,452,361 B2 | 9/2002 | Dougherty et al. | |
| 6,577,105 B1 | 6/2003 | Iwaizono | |
| 6,636,014 B1 * | 10/2003 | Payne | 320/104 |
| 6,710,575 B2 | 3/2004 | Youn | |
| 6,717,291 B2 | 4/2004 | Purkey | |
| 6,734,651 B2 | 5/2004 | Cook et al. | |
| 6,967,463 B1 * | 11/2005 | Gordon et al. | 320/103 |
| 2004/0164705 A1 | 8/2004 | Taniguchi | |
| 2004/0251870 A1 | 12/2004 | Ueda | |
| 2005/0077866 A1 | 4/2005 | Killian et al. | |

* cited by examiner

*Primary Examiner*—Patrick J Assouad
*Assistant Examiner*—Richard V Muralidar
(74) *Attorney, Agent, or Firm*—Harness, Dickey & Pierce, P.L.C.

(57) ABSTRACT

A trailer battery charge system for an electrical connection device between a vehicle and a trailer. The trailer battery charge system generally includes a first switching device that allows current to flow to an electrical terminal associated with a trailer battery of the trailer. A voltage sensor generates a voltage signal based on a voltage at the electrical terminal associated with the trailer battery. A control module controls the first switching device to charge the trailer battery based on the voltage signal.

20 Claims, 4 Drawing Sheets

TRAILER BATTERY CHARGE SYSTEMS AND METHODS

FIELD

The present teachings relate to methods and systems for monitoring and controlling current to an auxiliary power source of a trailer.

BACKGROUND

It is common for an owner of a vehicle, such as an automobile, truck or the like, to tow or trail various trailers, such as a camper trailer, a boat trailer, a storage trailer, or the like. Electrical power is made available to the trailer by means of an electrical wire connector electrically connected to the towing vehicle's electrical supply system. Vehicle electrical connectors can be made to accommodate connection between the various trailers and the vehicle. For example, the Society of Automotive Engineers (SAE) has promulgated a standardized connection scheme that allows for intermixed connection between various types of vehicles and trailers.

In some vehicles, a standardized connection scheme includes an output for providing current to an auxiliary power source such as a battery of the trailer. When the trailer is connected to the vehicle, a vehicle battery charges the trailer battery via the output of the electrical connector. When charged, the trailer battery supplies power to various electrical loads of the trailer. In many cases, trailers have brakes that assist the vehicle's brakes when stopping. In addition, when a break-away switch near a trailer hitch is opened (i.e. when the trailer becomes detached from the hitch) the trailer brakes will engage to stop the trailer. Many of these trailers rely on the trailer battery to provide power to the brakes in the event of the break-away. However, in some instances, the battery voltage may be insufficient to provide stopping power due to a lack of charge. Current methods of recognizing a lack of charge may include manually testing the battery before departure. Such methods are rarely performed by a vehicle owner before each departure.

SUMMARY

The present teachings generally include a trailer battery charge system for an electrical connection device between a vehicle and a trailer. The trailer battery charge system generally includes a first switching device that allows current to flow to an electrical terminal associated with a trailer battery of the trailer. A voltage sensor generates a voltage signal based on a voltage at the electrical terminal associated with the trailer battery. A control module controls the first switching device to charge the trailer battery based on the voltage signal.

Further areas of applicability will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION

Figure 1:
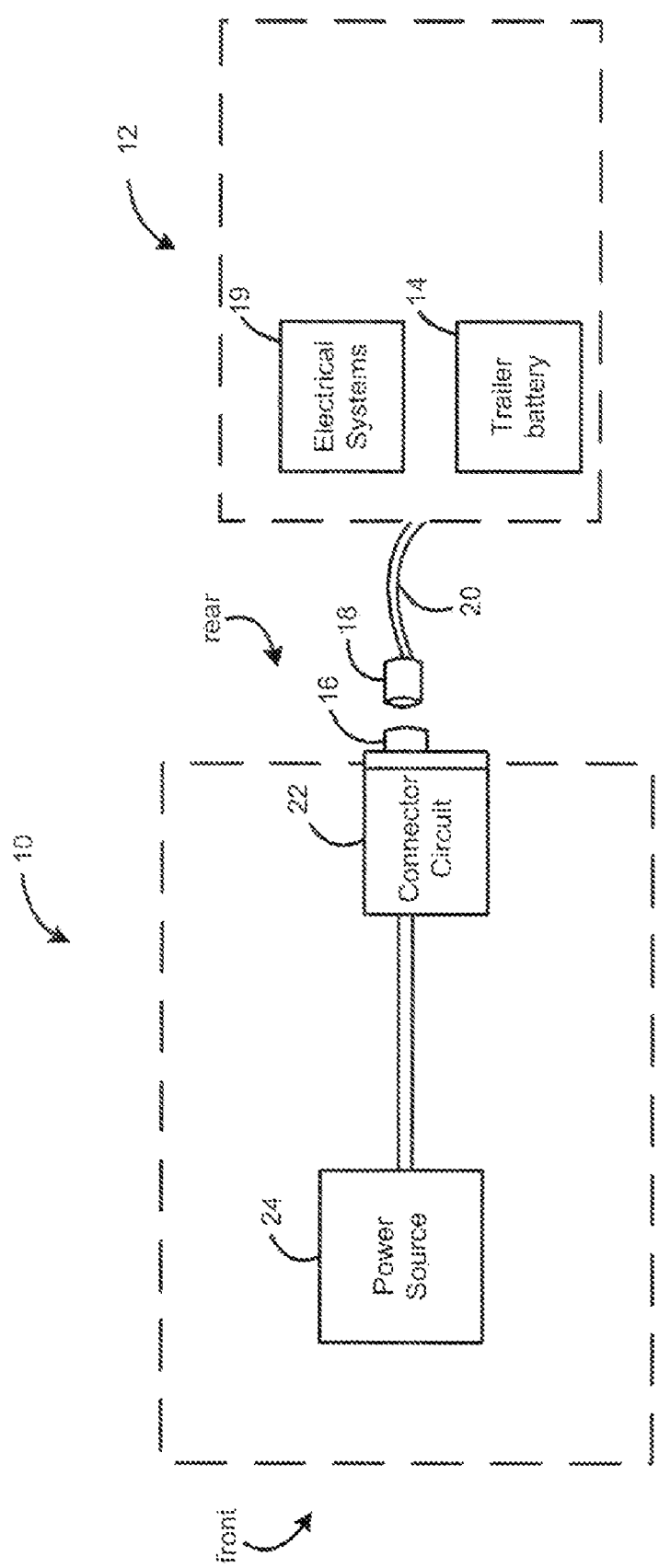
FIG. 1 is a block diagram illustrating a vehicle including a trailer battery charge system in accordance with various aspects of the present teachings.

The following description is merely exemplary in nature and is not intended to limit the present teachings, their application, or uses. It should be understood that throughout the drawings, corresponding reference numerals indicate like or corresponding parts and features. As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electromechanical components that can provide the described functionality and/or combinations thereof.

With reference to FIG. 1 and in one aspect of the present teachings, a vehicle shown generally at 10 can include a trailer battery charge system for an electrical connection device. It can be appreciated in light of the disclosure that the trailer battery charge system may be applicable to various electrical connection devices. For example, a similar electrical connection device may be used for tractors and trailers and between multiple trailers. For exemplary purposes, various aspects of the trailer battery charge system will be discussed in the context of the vehicle 10 and a trailer 12 that can include a battery 14.

As shown in FIG. 1, the vehicle 10 can include at least one vehicle electrical connector 16 that can couple to or be near a rear end of the vehicle 10. The vehicle electrical connector 16 can include a plurality of output pins that can mate with a plurality of receptacles, or electrical terminals of a trailer electrical connector 18. In various embodiments, the trailer electrical connector 18 can be connected and disconnected to the vehicle electrical connector 16. When connected to the vehicle electrical connector 16, the trailer electrical connector 18 can provide current to various electrical systems 19 and the battery 14 of the trailer via a wiring harness 20. Such electrical systems 19 may include, but are not limited to, tail light systems, turn signal systems, and a braking system.

As will be discussed further below, the trailer battery charge system includes a connector circuit 22 that can control the flow of current from a power source 24 to the trailer electrical connector 18. The connector circuit 22 can control the flow of current at a sufficient rate to control the varying electrical loads of the trailer 12. More particularly, the connector circuit 22 can monitor the state of charge of the trailer battery 14, provide a warning indication when the trailer battery 14 is out of charge, can adjust the flow of current to the trailer battery 14 based on a total trailer load (current) and a trailer battery voltage, can provide protection against electromechanical corrosion of electrical terminals of the trailer connector 18, and/or one or more combinations thereof.

Figure 2:
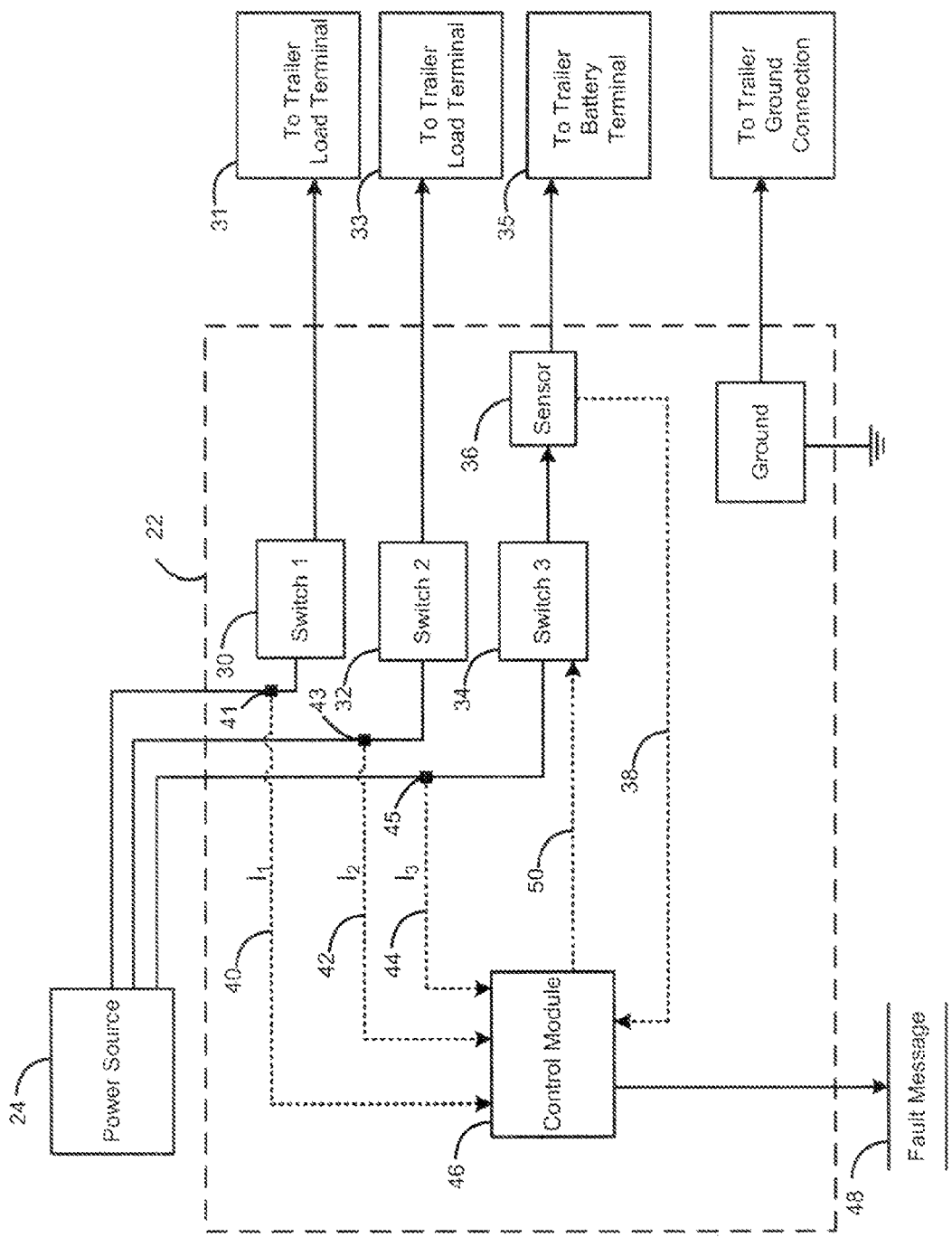
FIG. 2 is a block diagram illustrating a trailer battery charge system in accordance with various aspects of the present teachings.

With reference to FIG. 2 and in one aspect of the present teachings, a block diagram illustrates a trailer battery charge system implemented in the connector circuit 22. The connector circuit 22 can include a plurality of switches 30, 32, and 34 and/or relays (hereinafter referred to as switches) that control the flow of current to a respective electrical terminal 31, 33, and 35 of the trailer electrical connector 18 (FIG. 1). For example, a first switch 30 and a second switch 32 can provide current to a trailer load terminal 31 and 33; while a third switch 34 can be controlled to provide current to a trailer battery terminal 35. A voltage sensor 36 can sense the voltage at or before the trailer battery terminal and can generate a voltage signal 38 accordingly. Current sensors 41, 43, and 45 can generate current signals 40, 42, 44 respectively that can indicate a level of current ($I_1$, $I_2$, and $I_3$) flowing through each switch 30, 32, and 34 respectively from the power source 24. A control module 46 can receive the voltage signal 38 and the current signals 40, 42, 44 and can control the third switch 34 also referred to as a trailer battery switch to charge the trailer battery 14 (FIG. 1). The control module 46 can control the third switch based on a trailer battery charge method of the present teachings.

More particularly, the control module 46, measures the trailer battery state of charge based on the voltage signal 38 and/or the current signal 44. If the trailer battery state of charge is high, charging does not occur. If the trailer battery state of charge is slightly low, charging only occurs when the total trailer load condition (the summation of current $I_1$~$I_3$) is low. If the trailer battery voltage is extremely low, a fault message 48 can be generated to the vehicle 10 (FIG. 1) either discretely or through a vehicle network interface. If the trailer battery state of charge is extremely low and the total trailer load condition is high, the control module 46 can generate a control signal 50 to the third switch 34 that can charge the trailer battery 14 (FIG. 1). In various embodiments, the control module 46 can generate a pulse width modulated signal (PWM) to limit the total trailer load current within a non-destructive level. If the trailer battery voltage is zero, the control module 46 can determine that the trailer battery is not present. The third switch 34 will not be energized to limit the possible electrochemical corrosion on the trailer battery terminal 35.

Figure 3:
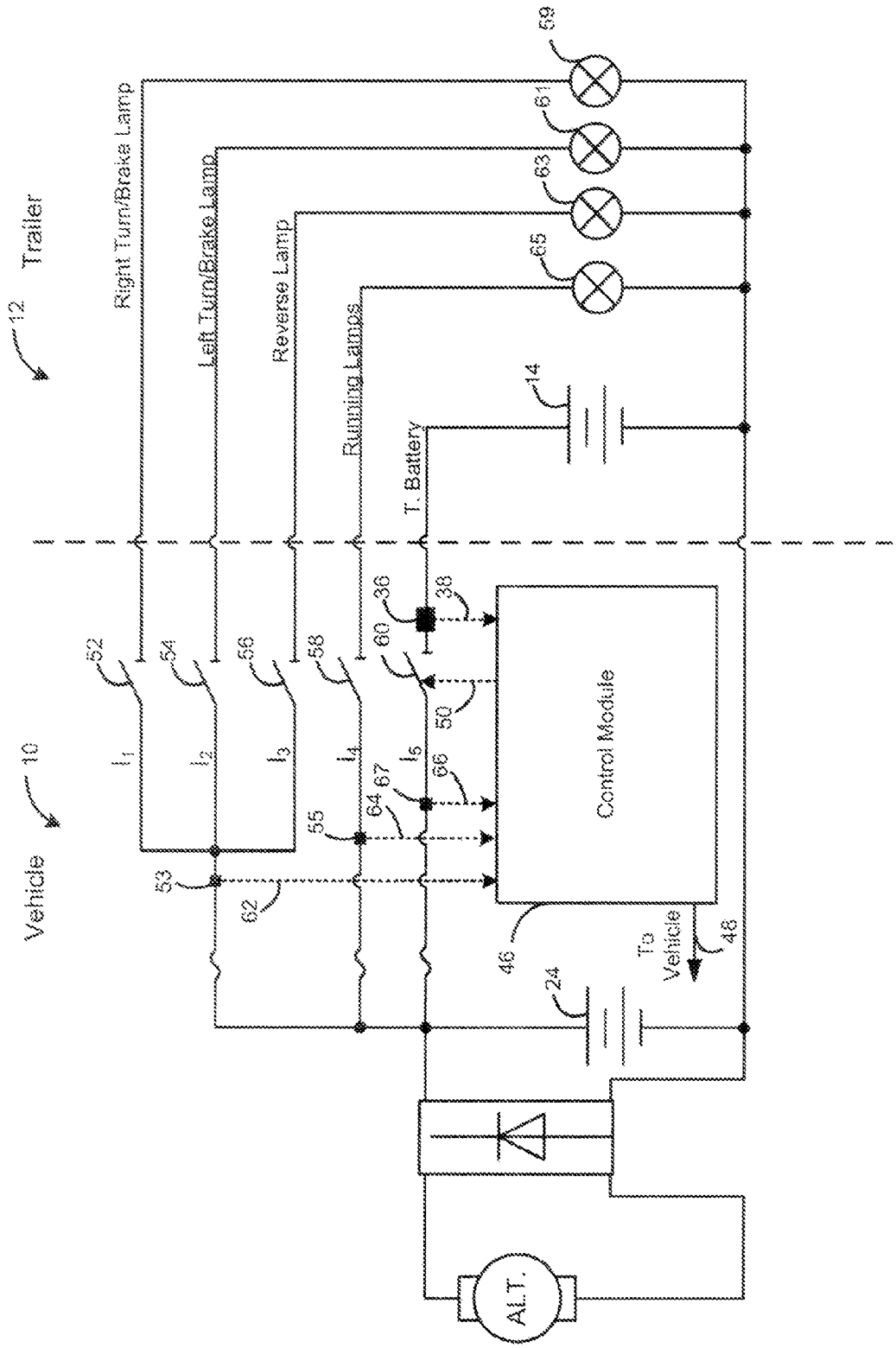
FIG. 3 is a diagram illustrating an example electrical schematic of a trailer battery charge system implemented in a vehicle in accordance with various aspects of the present teachings.

With reference to FIG. 3, an exemplary electrical schematic illustrates an example of a trailer battery charge system implemented in the vehicle 10 in accordance with various aspects of the present teachings. As shown, the trailer battery charge system can include five switches 52, 54, 56, 58 and 60, four of which 52, 54, 56, and 58 can allow current to flow to trailer loads such as right turn/brake lamp 59, left turn/brake lamp 61, reverse lamp 63, and running lamps 65. The fifth trailer battery switch 60 can be controlled by the control module 46 via control signal 50 to allow current to flow to the trailer battery 14. The voltage sensor 36 can generate the voltage signal 38 based on the voltage at the battery terminal. Current sensors 53, 55, and 67 can generate current signals 62, 64, and 66 respectively that can indicate a level of current flowing to switches 52, 54, and 56 ($I_1+I_2+I_3$), switch 58 ($I_4$), and switch 60 ($I_5$) respectively. The control module 46 can generate the control signal 50 to the trailer battery switch 60 based on the current signals 62, 64, and 66 and the voltage signal 38.

In one aspect of the present teachings, the control signal 50 is a pulse width modulated (PWM) signal. The control module 46 can generate the pulse width modulated control signal (D) based on the total maximum current ($I_{MAX}$) and the following relationship:

$$D <= [I_{MAX} - (I_1+I_2+I_3+I_4)]/I_5.$$

Figure 4:
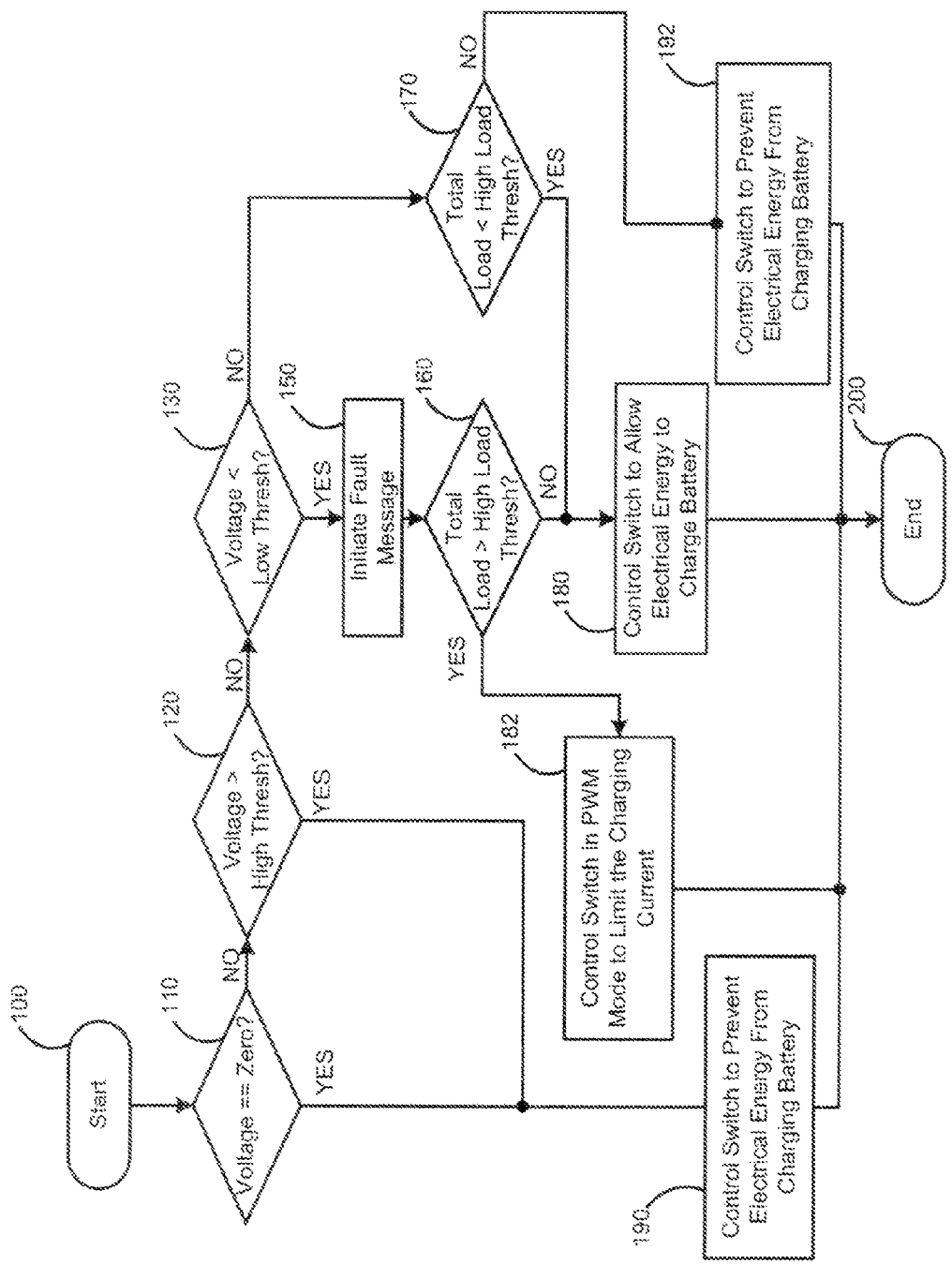
FIG. 4 is a process flow diagram illustrating a trailer battery method as performed by a control module of the trailer battery charge system in accordance with various aspects of the present teachings.

With reference to FIG. 4 and continued reference to FIG. 2, a process flow diagram illustrating a battery charge method that can be performed by the trailer battery charge system in accordance with various aspects of the present teachings is shown. The method may be run by the control module 46 of the connector circuit 22 continually during vehicle operation. As can be appreciated in light of the disclosure, the order of operation within the method is not limited to the sequential execution as illustrated in FIG. 4, but may be performed in one or more varying orders as applicable, in accordance with the present teachings.

In one example, the method begins at 100. The voltage signal 38 is monitored at 110, 120, and 130. If the voltage signal 38 indicates that the voltage is equal to zero at 110, the trailer battery 14 is not present on the trailer 12. The trailer battery switch 34 can be controlled to prevent the flow of current to the battery terminal 35 at 190 thus preventing possible electrochemical corrosion on the battery terminal 35. The method may end at 200. Otherwise, if the voltage signal 38 indicates that the voltage is greater than a predetermined high threshold at 120, the trailer battery switch 34 can be controlled to prevent the flow of current to the battery terminal 35 at 190 thus preventing over charging of the trailer battery 14. The method may end at 200.

Otherwise, if the voltage signal 38 indicates that the voltage is below a predetermined low threshold at 130, the fault message 48 can be generated at 150. As can be appreciated in light of the disclosure, the fault message 48 can be used to notify other systems and users of the lack of charge. In one aspect of the present teachings, a diagnostic code is set based on the fault message 48. The diagnostic code can be retrieved by a service tool or transmitted to a remote location via a telematics system. In other aspects of the present teachings, an indicator lamp of the vehicle 10 (FIG. 1) can be illuminated based on the fault message 48. In a further aspect of the present teachings, an audio warning signal can be generated based on the fault message 48. At 160, the current signals can be evaluated to determine the total load. If the total load is greater than a high load threshold at 160, the trailer battery switch can be controlled in the PWM mode to allow limited current to flow to the battery terminal 35 to charge the trailer battery 14 at 182. The method may end at 200. Otherwise, if the total load is less than the high load threshold at 160, the trailer battery switch 34 can be controlled to allow the flow of current to the battery terminal 35 at 180 to charge the trailer battery 14. The method may end at 200.

Otherwise, the current signals can be evaluated at 170 to determine the total load. If the total load is less than a high load threshold at 170, the switch can be controlled to allow current to flow to the terminal to charge the trailer battery 14 at 180. The method may end at 200. Otherwise, if the total load is greater than the high load threshold at 170, the trailer battery switch 34 can be controlled to prevent the flow of current to the battery terminal 35 at 192 thus preventing over charging of the trailer battery 14. The method may end at 200.

As can be appreciated in light of the disclosure, all comparisons discussed above can be implemented in various forms depending on the selected values for comparison. For example, a comparison of "greater than" may be implemented as "greater than or equal to" in various aspects of the present teachings. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect of the present teachings may be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A trailer battery charge system that charges a trailer battery on a trailer through an electrical connection device that connects a vehicle with the trailer, the trailer battery charge system comprising:
a first switching device that allows current to flow to a terminal of the trailer battery;
a voltage sensor that generates a voltage signal based on voltage at the terminal of the trailer battery;
at first current sensor that generates a current signal based on current flowing to a trailer electrical system;
a control module that controls the first switching device to charge the trailer battery based on the voltage signal and the current signal, such that current flows to the terminal of the trailer battery when the voltage signal indicates voltage is less than a predetermined low threshold, and the current flow to the trailer electrical system indicates that the current flow is less than a predetermined high load threshold.

2. The trailer battery charge system of claim 1, wherein the control module generates a pulse width modulated signal to control the first switching device based on one of the voltage signal and the current signal.

3. The trailer battery charge system of claim 1, wherein the control module controls the first switching device to prevent current from flowing to the terminal of the terminal battery when the voltage signal indicates voltage is greater than a predetermined high threshold.

4. The trailer battery charge system of claim 1 further comprising at least a second switching device that allows current to flow to a terminal of the trailer electrical system, the control module controls the second switching device based on the current flow to the terminal of the trailer electrical system, the control module controls the first switching device to limit current flow to the terminal of the trailer battery when the voltage signal indicates voltage is less than a predetermined low threshold, and the current flow to the terminal associated with the trailer electrical system indicates that current is greater than a predetermined high load threshold.

5. The trailer battery charge system of claim 1, wherein the control module generates a fault message when the voltage signal indicates the voltage is less than a predetermined low threshold.

6. The trailer battery charge system of claim 1, wherein the control module controls the first switching device such that current does not flow to the terminal of the trailer battery when the voltage signal indicates voltage is equal to a first predetermined value.

7. The trailer battery charge system of claim 1, wherein the control module controls the first switching device to prevent current from flowing to the terminal of the trailer battery when the voltage signal is less than a predetermined high threshold, when the voltage signal is greater than a predetermined low threshold, and when the current flow to the terminal of the trailer electrical system indicates that current is greater than a predetermined high load threshold.

8. The trailer battery charge system of claim 1, wherein the control module determines a state of charge of the trailer battery based on at least one of the voltage signal and the current signal, the control module controls the first switching device based on the state of charge.

9. A method of charging an auxiliary power source of a trailer via an electrical connection from a vehicle, the method comprising:
generating a voltage signal based on voltage at a terminal of the auxiliary power source of the trailer;
detecting a state of charge of the auxiliary power source based on the voltage signal;
generating a current signal based on current flowing to a terminal of an electrical system of the trailer;
controlling current to the terminal of the auxiliary power source based on the state of charge and the current signal;
allowing current to flow to the terminal of the trailer battery when the state of charge indicates the voltage signal is less than a predetermined high threshold and the current signal indicates that current to the terminal of the trailer electrical system of the trailer is less than a predetermined high load threshold.

10. The method of claim 9 further comprising generating a current signal based on current flow to the trailer auxiliary power source, wherein the detecting comprises detecting the state of charge of the auxiliary power source based on the current signal.

11. The method of claim 9 further comprising limiting current to the terminal of the trailer battery when the state of charge indicates the voltage signal is less than a predetermined low threshold and the current signal indicates current through the terminal of the trailer electrical system is greater than a predetermined high load threshold.

12. The method of claim 9 further comprising generating a fault message when the voltage signal indicates voltage is less than a predetermined low threshold.

13. The method of claim 9 further comprising preventing current from flowing to the terminal of the trailer battery when the state of charge indicates the auxiliary power source is not present.

14. The method of claim 9 further comprising preventing current from flowing to the terminal of the trailer battery when the state of charge indicates that the auxiliary power source is fully charged.

15. A trailer battery charge system that charges a trailer battery on a trailer with a trailer electrical system through an electrical connection device that connects a vehicle with the trailer, the trailer battery charge system comprising:
a first switching device that allows current to flow to a terminal of the trailer battery;
a voltage sensor that generates a voltage signal based on voltage at the terminal of the trailer battery;
a second switching device that permits current to flow to a terminal of the trailer electrical system;
a control module that controls the first switching device to charge the trailer battery based on the voltage signal from the trailer battery and on the current through the terminal of the trailer electrical system, the control module limits the flow of current to the terminal of the trailer battery when voltage at the trailer battery is less than a predetermined low threshold, and current through the terminal of the trailer electrical system is greater than a predetermined high load threshold.

16. The trailer battery charge system of claim 15, wherein the control module generates a pulse width modulated signal to control the first switching device based on one of the voltage signal from the trailer battery and the current through the terminal of the trailer electrical system.

17. The trailer battery charge system of claim 15, wherein the control module controls the first switching device to prevent current from flowing to the terminal of the trailer battery when the voltage signal is less than a predetermined high threshold, when the voltage signal is greater than a predetermined low threshold, and when current through the terminal associated with the trailer electrical system indicates that current is greater than a predetermined high load threshold.

18. A method of charging an auxiliary power source of a trailer via an electrical connection of a vehicle, the method comprising:
   generating a voltage signal based on voltage at a terminal of the auxiliary power source of the trailer;
   detecting a state of charge of the auxiliary power source based on the voltage signal;
   generating a current signal based on current flowing through a terminal of a trailer electrical system;
   controlling current to the terminal of the auxiliary power source based on the state of charge and the current signal from the trailer electrical system;
   limiting current to the terminal of the trailer battery when the state of charge indicates voltage at the terminal of the auxiliary power source is less than a predetermined low threshold and the current signal that indicates current through the terminal of the trailer electrical system is greater than a predetermined high load threshold.

19. The method of claim 18 further comprising preventing current from flowing to the terminal of the trailer battery when the state of charge indicates the auxiliary power source is not present.

20. The method of claim 18 further comprising preventing current from flowing to the terminal of the trailer battery when the state of charge indicates the auxiliary power source is fully charged.

* * * * *